US011663660B1

(12) United States Patent
Koo et al.

(10) Patent No.: US 11,663,660 B1
(45) Date of Patent: May 30, 2023

(54) INFORMATION DISPLAY AND DECISION MAKING

(71) Applicant: Wells Fargo Bank, N.A., San Francisco, CA (US)

(72) Inventors: Seung Koo, Edina, MN (US); Jan M. Emter, Minneapolis, MN (US); Mario Nardi, St. Paul, MN (US); Richard C. Edwards, West Des Moines, IA (US); Archana Bhandary Upadhyay, Prior Lake, MN (US); Manoj S. Magavi, Edina, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 854 days.

(21) Appl. No.: 16/530,102

(22) Filed: Aug. 2, 2019

Related U.S. Application Data

(63) Continuation of application No. 14/961,336, filed on Dec. 7, 2015, now Pat. No. 10,417,705.

(51) Int. Cl.
*G06Q 40/06* (2012.01)
*G06Q 40/03* (2023.01)
*G06Q 40/00* (2023.01)

(52) U.S. Cl.
CPC ............ *G06Q 40/03* (2023.01); *G06Q 40/00* (2013.01)

(58) Field of Classification Search
CPC ....... G06Q 40/025; G06Q 40/00; G06Q 40/03
See application file for complete search history.

(56) References Cited

U.S. PATENT DOCUMENTS

| 7,558,756 B1* | 7/2009 | Wesly ................ G06Q 40/03 705/38 |
| 2005/0278246 A1* | 12/2005 | Friedman ............. G06Q 40/08 705/38 |
| 2014/0351115 A1* | 11/2014 | Dahiwadkar ......... G06Q 40/02 705/38 |

FOREIGN PATENT DOCUMENTS

WO     WO-2016191979 A1 * 12/2016 ............. G06Q 40/00

OTHER PUBLICATIONS

J. Cary Barton & Reid C. Wilson, Conventional Loan Workouts, Feb. 26, 2010, Barton, East, & Caldwell, L.L.P., web, 1-9 (Year: 2010).*

* cited by examiner

*Primary Examiner* — I Jung Liu
(74) *Attorney, Agent, or Firm* — Merchant & Gould P.C.

(57) ABSTRACT

An information display system includes a computing system that is configured to implement a user interface, access a first database storing a plurality of loan workout rules, receive loan and borrower data regarding an existing loan, and determine a plurality of loan workout options based on the plurality of loan workout rules and the received loan and borrower data. The plurality of loan workout options are displayed on the user interface.

20 Claims, 10 Drawing Sheets

| Plan Results | Manual Inputs Review | Borrower Letter | | | | |
|---|---|---|---|---|---|---|
| Plan Type | Decision Source | Evaluation | Eligible | Post HDTI% | Payment Adjustment $ | P&I Adjustment |
| Special Forbearance RPP | Internal | Final | ⊘ | 78.611 % | $3074.48 | N/A |
| Special Forbearance Unemployment | Internal | Final | ⊕ | 61.629 % | $1874.22 | N/A |
| Loan Modification | Internal | Trial | ⊕ | 33.402 % | $-120.93 | $-127.22 |
| Loan Modification | Internal | Final | ⊕ | 32.791 % | $-164.11 | $-170.40 |
| HAMP | Internal | Trial | ⊕ | 28.090 % | $-496.34 | $-502.63 |
| HAMP | Internal | Final | ⊕ | 28.090 % | $-496.34 | $-502.63 |

FIG. 2

Workout Review

Return to List

708-0083103598

| | | | | Audit |
|---|---|---|---|---|
| Policy: | FHA | Remaining Surplus: | $ 0.53 | Monthly P&I: $972.25 | Decision ID: 15042387243 |
| Investor Loan Number: | 0208850690 | Days Delinquent: | 143 | Remaining Maturity Term: 326 | Decisioned: 04/23/2015 |
| Guarantor Case Number: | 291-3625933 | Loan Age (In Months): | 87 | Net Income: 5000 | Gapen, James |
| Mortgagor Name: | KASZYNSKI, CORTEZ G | Total Monthly Payment: | $1310.15 | Escrow Advance: $-382.38 | HPAI_SLD_TST0072 |
| Payments Due: | 5 | Escrow Balance: | $-382.38 | Total Expenses: 7500 | Committed: 04/23/2015 |
| Maturity Term (In Months): | 360 | Gross Income: | 3814.00 | Monthly Escrow: $337.90 | James Gapen |
| Interest Rate: | 4.250 | Appraised Value: | N/A | Unpaid Principal Balance: 188915.65 | HPAI_SLD_TST0072 |
| PMMS Rate: | N/A | | | Loan Due Date: 12/01/2014 | Committed Status: APPROVED |
| PMMS Date: | N/A | | | BRP Indicator: | Evaluation Purpose: Standard |
| Original Maturity Date: | 06/01/2042 | | | CURR Occupancy: PrimaryResidence | |
| | | | | Imminent Default: Yes | |
| | | | | Pre-Mod LTV%: N/A | |

Appeal Reason -SELECT- ▼

| Property Type: | Single Family | Property Number of Units: | 1 | PMI Amount: | 67.27 |
| HOA Dues: | 25.00 | Tax: | $190.13 | Origination Date: | 01/24/2008 |
| Hazard Insurance: | $80.50 | Flood Insurance: | $0.00 | Appraisal Type: | N/A |
| Appraisal Date: | N/A | Property Condition: | Fair | Leasehold: | N/A |
| Imminent Default Source: | N/A | Liquid Assets: | N/A | Non-Liquid Assets: | N/A |

Submit | Reset

Plan Results | Manual Inputs Review | Borrower Letter

| Plan Type | Decision Source | Evaluation | Eligible | Post HDTI% | Payment Adjustment $ | P&I Adjustment |
|---|---|---|---|---|---|---|
| Special Forbearance RPP | Internal | Final | ⊙ | 64.266 % | $ 1115.94 | N/A |
| Special Forbearance Unemployment | Internal | Final | ⊙ | 49.497 % | $ 552.42 | N/A |
| Loan Modification | Internal | Final | ⊙ | 35.710 % | $ 26.84 | $ 2.76 |
| Loan Modification | Internal | Final | ⊙ | 35.097 % | $ 3.45 | $ 20.63 |
| ⊙ HAMP | Internal | Final | ⊙ | 28.090 % | $ -262.30 | $ -286.11 |
| HAMP | Internal | Final | ⊙ | 28.090 % | $ -262.03 | $ -286.11 |

| Field Name | Original Value | New Value |
|---|---|---|
| Total Expenses: | 6007.77 | 7500 |
| Net Income: | 6008.3 | 5000 |

FIG. 4

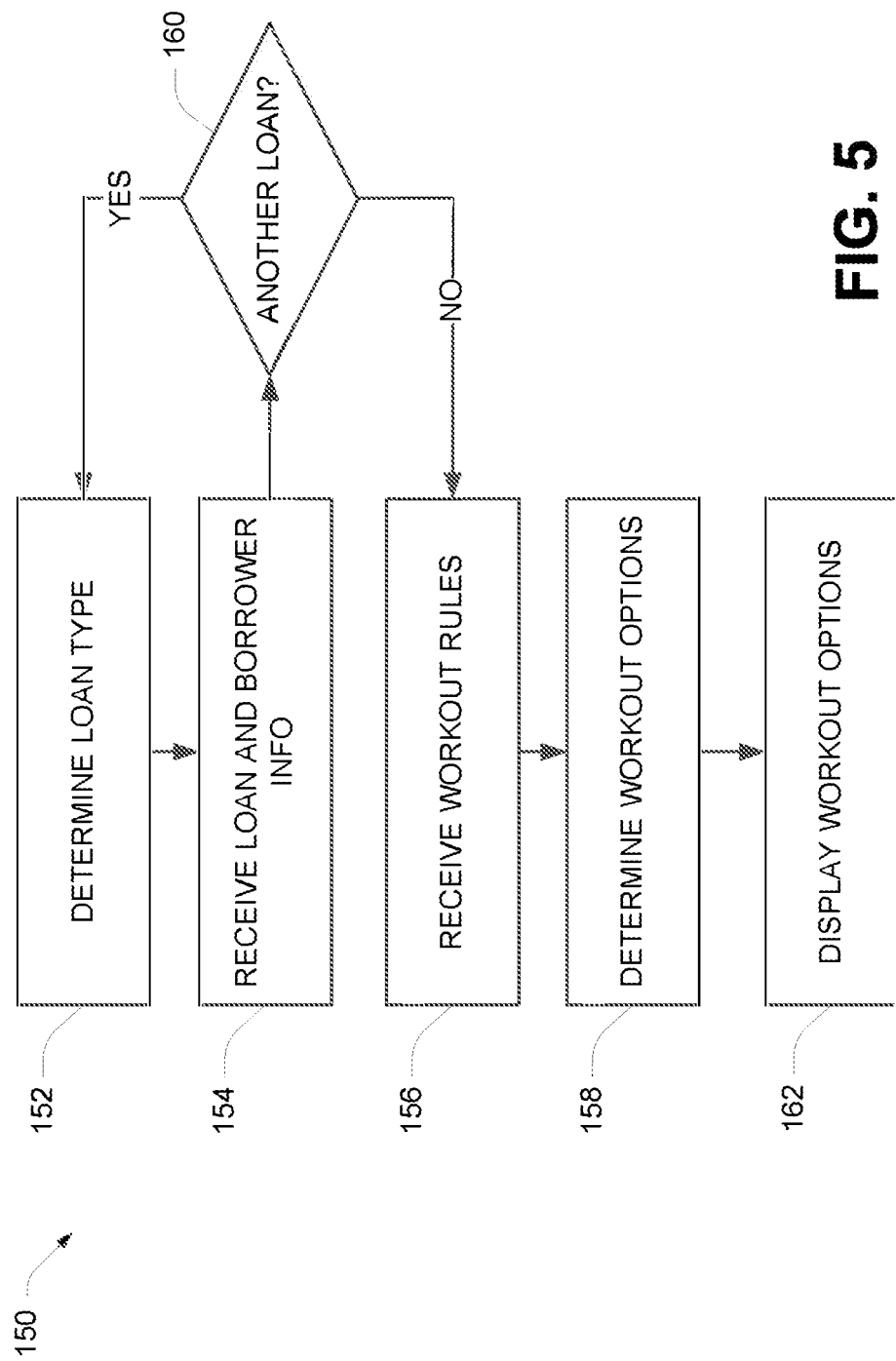

Workout Review

Return to List

⊕ Loan 1: 1st Lien Mortgage — 410 — 708-0044556677

| | | | |
|---|---|---|---|
| Policy: | FNMA | Remaining Surplus: | N/A | Monthly P&I: | $ 1165.01 |
| Investor Loan Number: | 1702107231 | Days Delinquent: | 580 | Remaining Maturity Term: | 249 |
| Guarantor Case Number: | N/A | Loan Age (In Months): | 112 | Net Income: | $ 4918.63 |
| Mortgagor Name: | ZUMPANO, LLEWELLYN | Total Monthly Payment: | $ 1962.03 | Total Expenses: | $ 2310.09 |
| Payments Due: | 20 | Escrow Balance: | $ -13869.30 | Monthly Escrow: | $ 797.02 |
| Maturity Term (In Months): | 287 | Gross Income: | $ 3163.00 | Unpaid Principal Balance: | $ 225122.94 |
| Interest Rate: | 3.125 % | Appraised Value: | $ 202611.00 | Loan Due Date: | 04/01/2014 |
| PMMS Rate: | N/A | | | BRP Indicator: | Yes |
| PMMS Date: | N/A | | | Property Usage: | Primary Residence |
| Original Maturity Date: | 08/01/2036 | | | Abandoned: | No |
| | | | | Imminent Default: | N/A |
| | | | | Pre-Mod LTV%: | 111.111% |

⇧ Loan 2: Auto Loan — 412 — 200456189

⇧ Loan 3: Home Equity — 414 — 40-123456789

Plan Results- Loan 1 | Plan Results- Loan 1 | Plan Results- Loan 2 | Plan Results- Loan 3 | Manual Inputs Review | Borrower Letter

| Plan Type | Decision Source | Evaluation | Eligible | Post HDT% | Payment Adjustment $ | P&I Adjustment |
|---|---|---|---|---|---|---|
| Combo Mod | Internal | Trial | ⊕ | N/A | N/A | N/A |
| Combo Short Refinance | Internal | Trial | ⊕ | N/A | N/A | N/A |

FIG. 12

Plan Results- All Loans | Plan Results- Loan 1 | Plan Results- Loan 2 | Plan Results- Loan 3 | Manual Inputs Review | Borrower Letter

| Plan Type | Decision Source | Evaluation | Eligible | Post HDT% | Payment Adjustment $ | P&I Adjustment |
|---|---|---|---|---|---|---|
| HAMP | SMDU | Trial | ⊕ | N/A | N/A | N/A |
| Mod 24 | SMDU | Trial | ⊕ | N/A | N/A | N/A |
| New Mod | SMDU | Trial | ⊕ | N/A | N/A | N/A |
| Streamline Mod | SMDU | Trial | ⊕ | N/A | N/A | N/A |
| Cap Extend | SMDU | Trial | ⊕ | N/A | N/A | N/A |
| RPP | SMDU | Final | ⊕ | N/A | N/A | N/A |

INFORMATION DISPLAY AND DECISION MAKING

BACKGROUND

Financial transactions such as loans are often complex and require compliance with many rules, regulations, policies, guidelines, etc. that are established by entities such as regulators, investors, and insurers/guarantors. In situations where a borrower is unable to make the required payments, alternative arrangements are often sought. For example, with a home mortgage loan, loss mitigation alternatives to avoid foreclosure are often desirable if the mortgage loan is in default.

Such loss mitigation alternatives may include, for example, permanently modifying or restructuring the loan, or offering the borrower a moratorium or other temporary forbearance to give them time to bring the loan current. The various loan workout options may have different rules and regulations established by loan investors such as the Federal Home Loan Mortgage Corporation ("Freddie Mac"), the Federal National Mortgage Association ("Fannie Mae"), private investors, etc., as well as rules and regulations of loan guarantors and insurers such as the U.S. Veterans Administration ("VA"), the U.S. Federal Housing Administration ("FHA"), United States Department of Agriculture ("USDA"), private insurers, etc. Moreover, regulators such as the Consumer Financial Protection Bureau ("CFPB") and the Office of the Comptroller of the Currency ("OCC") have further rules and regulations for working with borrowers in default, resulting in increased complexity.

SUMMARY

In accordance with certain aspects of the present disclosure, an information decision and display system includes a computing system configured to implement a user interface. The computing system further is configured to access a first database storing a plurality of loan workout rules, receive loan and borrower data regarding an existing loan and determine a plurality of loan workout options to evaluate based on the plurality of loan workout rules and the received loan and borrower data. The details of all evaluated loan workout options are displayed on the user interface.

In some examples, the borrower data is stored in a second database that is accessed by the computing system. In still further examples, the borrower data or further borrower data is received via the user interface. Such received borrower data may include edits to the borrower data received from the second database. The workout options may be saved in a decisions database, allowing access to the information at a later time.

DESCRIPTION OF THE DRAWINGS

FIG. 2 is a user interface screen shot illustrating an example of a display of loan workout options.

FIG. 4 is a user interface screen shot illustrating an example a loan workout decision display.

FIG. 5 is a flow diagram illustrating an example process executed by the system shown in FIG. 1.

FIG. 10 illustrates an example of a workout review display for multiple loans.

FIG. 11 illustrates an example of a plan summary table for multiple loans.

FIG. 12 illustrates another example of the plan summary table shown in FIG. 11.

DETAILED DESCRIPTION

Figure 1:
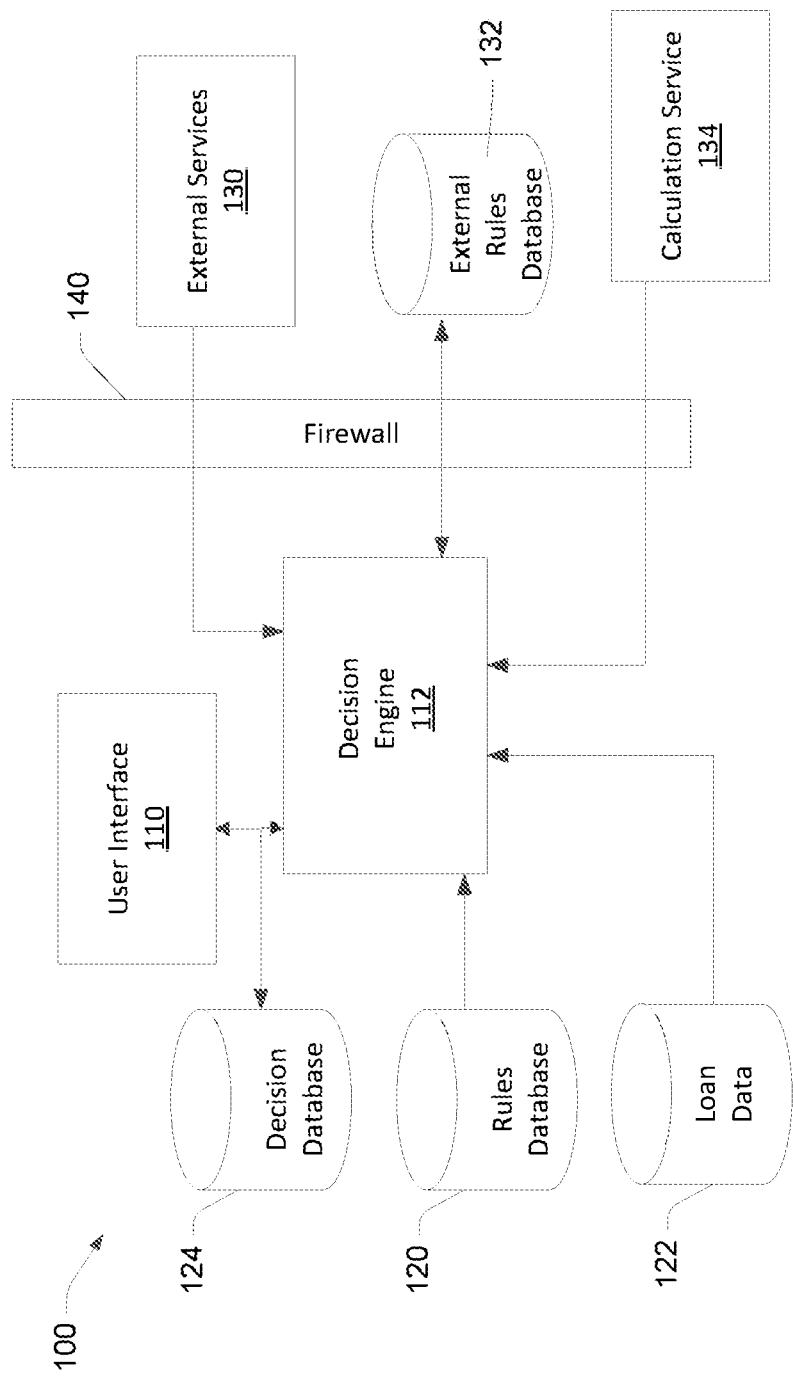
FIG. 1 is a block diagram illustrating an example of an information decision and display system in accordance with aspects of the present disclosure.

In the following Detailed Description, reference is made to the accompanying drawings, which form a part hereof, and in which is shown by way of illustration specific embodiments in which the invention may be practiced. The following detailed description, therefore, is not to be taken in a limiting sense.

Loans, especially mortgage loans, are complex financial transactions. Due to various circumstances, borrowers sometimes are unable to make the agreed loan payments. In these situations it is often preferable for both the lender and the borrower to find solutions other than foreclosure or write offs. Such an alternative is sometimes referred to as a "loan workout." Loan workouts can include "permanent loan modification" or "mortgage modification," in which alternative loan options are considered to replace the existing loan, or temporary forbearance options to allow the borrower time to bring the loan current. In some situations, temporary forbearance and permanent modification options are used in combination. For example, if a borrower becomes unemployed they may qualify to have their payments temporarily lowered. (This results in the loan becoming further delinquent). When the borrower finds a job, they may qualify to then get a permanent modification to take care of the delinquency and reinstate the loan.

Known automated loan underwriting tools, and more specifically loss mitigation automated tools, typically are designed only for a certain loan product, such as mortgage loans, and only for limited credit policy scope. For example, a given automated loan underwriting system may be customized for a single investor's credit policy, and thus may be configured to perform calculations and display information in accordance with rules and guidelines associated with a specific loan product.

Such solutions are often unacceptable for loan servicers who service a broad portfolio of loan types, since many different solutions and loan workout options must be considered and evaluated to obtain the best loan workout decision. Example systems disclosed herein provide the ability to evaluate and underwrite multiple loan products simultaneously and determine loan alternatives to avoid default. For instance, loan investors (Freddie Mac, Fannie Mae, private investors, etc.) and loan guarantors (VA, FHA, USDA, private insurers, etc.) may each have rules and regulations specific to the particular agency. A single decision tool that performs calculations for a specific mortgage product would not easily allow comparison of multiple loan workout options.

In general, examples are disclosed herein that relate to information decision and display systems and methods that allow generating multiple loan workout options, including a plurality of temporary forbearance and/or permanent modification options, and displaying these options for a user to facilitate an efficient decision making process. Credit policies and investor guidelines associated with several investors and/or insurers, for example, may be stored in a common database, rather than accessing different rule sources for each type of loan workout option. This further allows modifying the stored rules as necessary to better service the customer or incorporate changes made for business reasons. A central rules repository allows servicers to better manage risks involved with complex business rules and reduce errors involved with manual processes. In other embodiments, rules may be stored in multiple rules repositories and a decision engine is configured to orchestrate among the various rules engines.

FIG. 1 illustrates various aspects of an example of a system in accordance with the present disclosure. The system 100 includes a computing system that implements a decision engine 112. The decision engine accesses one or more rules databases 120 that store a plurality of rules associated with various loan workout options. The system further includes a user interface 110 that interfaces with the decision engine 112.

The user interface 110 may include, for example, input devices such as a keyboard, a mouse, a pen, a sound or voice input device, a touch or swipe input device, etc. An output device such as a display monitor is further included. The user interface could be implemented via components local to the decision engine 112, or by other devices remote therefrom and connectable by a network such as the internet. Any suitable device, such as, for example, a mobile telephone, a smart phone, a tablet personal computer, a laptop computer, a desktop computer, and the like that are connectable to the decision engine 112 could implement the user interface 110.

In addition to the loan workout rules from the database 120, the decision engine 112 receives borrower data regarding an existing loan. Typically, this would be an existing loan that is in default. In some examples, information regarding the existing loan is received via the user interface 110. In other examples, one or more internal mortgage databases 122 (internal to the financial institution providing the loan and within a firewall 140) stores the current borrower and loan information used by the decision engine for generating the loan workout options. In still further examples, information is obtained from a third party or an external (outside the firewall 140) service provider 130 regarding the existing loan. External service providers could include, for example, external loan serving companies or calculation services such as certified net present value (NPV) or amortization calculation services.

In some examples, the computing system 100 is a server computer at a financial institution such as a bank, brokerage firm, mortgage company, etc. that implements the various components of the system 100, including the decision engine 112. Other examples of financial institutions are possible. Further, the system 100 may be implemented by one or more computer systems. The databases 120, 122, 124 could be a local component of the system 100, or they could be accessible by the decision engine 112 over a network such as a business computing network or the internet.

In the illustrated examples, a loan workout is desired. This could be due to a borrower's existing loan being in default, or for other reasons. Accordingly, different loan workout options are determined and displayed such that the involved parties can reach a decision. The decision engine 112 thus determines a plurality of loan workout options based on the applicable loan workout rules and the received borrower data, and displays various loan workout options including the plurality of temporary forbearance and/or permanent loan modification options on the user interface 110.

Besides displaying loan modifications, loan workouts could include, for example, recommendations to the borrower to qualify for loan products for which the customer is currently not eligible. Such recommendations could include increasing income, reducing spending, etc. For instance, a user could run "what if" scenarios simply by manipulate the input data (increasing income, reducing expenses, etc.) before submitting a decision request to the decision engine 112 and see what workout options are presented.

In addition to displaying the loan workouts, the loan workout information may be saved in a decision database 124 for later use. In some implementations, the entire decision transaction is stored in the database 124, which could include inputs to the decision (e.g., loan/borrower data, servicing data, etc.), outputs of the decision (workout options and related details), along with details about the status of that transaction. The user interface 110 may further facilitate production of various letters, reports and other extracts, for example, for presenting loan workout decisions to the borrower. Moreover, in some embodiments, in addition to, or in place of, displaying the loan workout information from the database 124 on the user interface 110, the information may be provided in a written report or provided as a flat file for input to other financial systems.

As noted above, the rules database 120 provides a repository for rules associated with several different loan entities. For example, the database 120 may store loan workout rules associated with a plurality of mortgage loan investors such as Freddie Mac, Fannie Mae, private investors, etc., and/or loan guarantors such as VA, FHA, USDA, private insurers, etc., and or regulators such as CFPB and OCC.

FIG. 2 is a screen shot of a portion an example information display 200 of the user interface 110. The display 200 includes a listing of various loan workout options 202 including different temporary forbearance and/or permanent loan modification options 210 determined by the decision engine 112. In addition to displaying the various loan workouts 202 evaluated, the decision source 212, evaluation type 214, and borrower eligibility 216 are displayed for each workout option. In the example shown in FIG. 2, comparisons of plan elements relative to the existing loan are also displayed, such as the total payment adjustment 220 and the principle and interest (P&I) adjustment 222.

Figure 3:
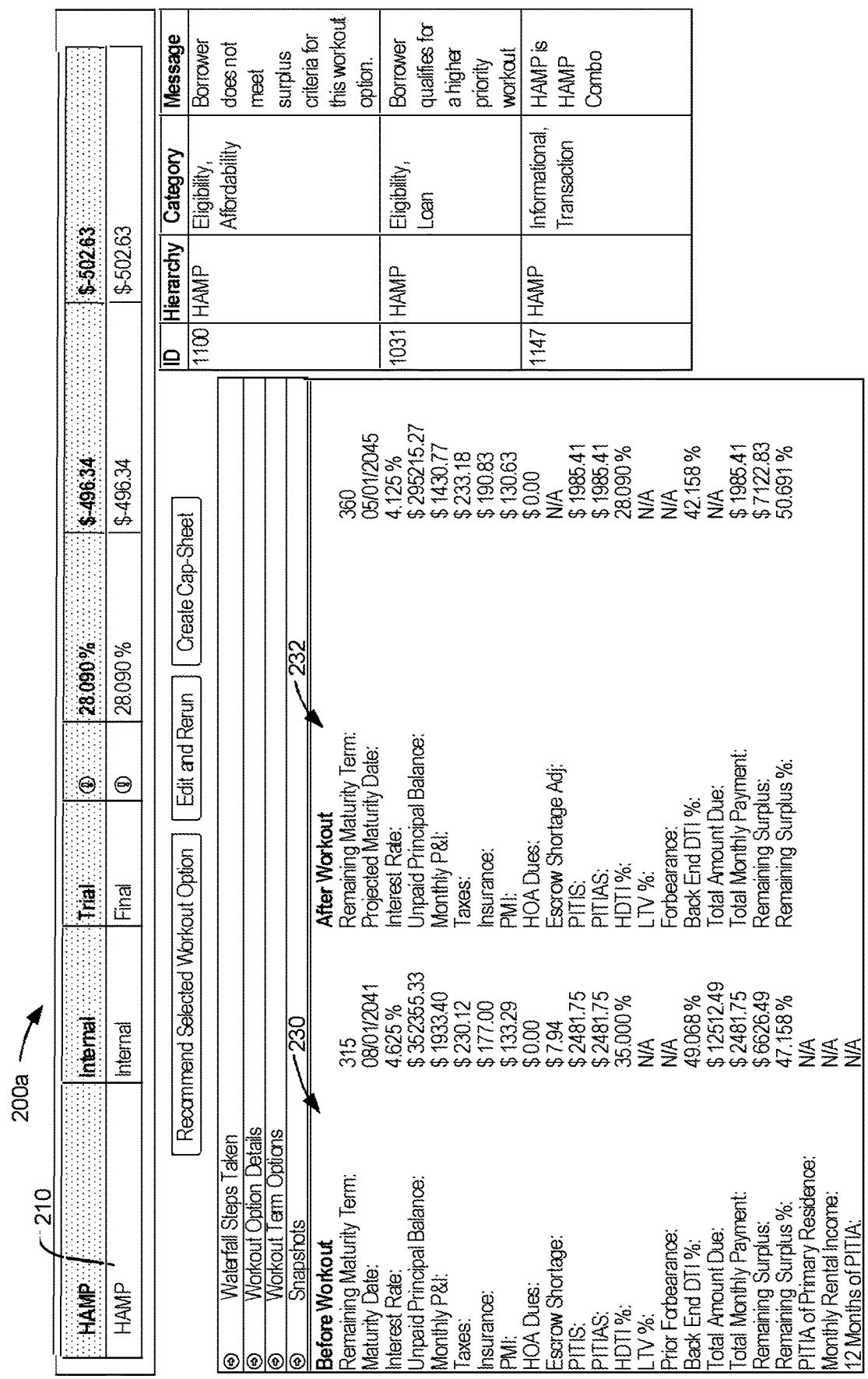
FIG. 3 is a user interface screen shot illustrating further aspects of the display of FIG. 2.

In the example shown in FIG. 2, workout options are presented in summary form, which allows the user to do high level comparisons of the various options. Additionally, individual options may be selected to "drill down" into the details of the selected option. In the specific example illustrated in FIG. 2, detailed results of each workout 202 are available by selecting a row in the results display 200. FIG. 3 illustrates an example of a display 200a in which one of the "HAMP" (Home Affordable Modification Program) workouts 210 shown in FIG. 2 has been selected. Among other things, the display 200a includes a side-by-side comparison of loan aspects before the workout 230 (the existing loan) and after workout 232 (the selected workout option).

Referring back to FIG. 1, in some examples the system 100 provides the ability for a party, such as the underwriter, to modify certain terms of the workout. In some instances, business needs may require adjusting or overriding certain of the loan workout details as an exception to the standard policy rules stored in the rules database 120. Such overrides may be made via the user interface 100 and input to the decision engine 112. Further, these overrides may be saved in the decision database 124 or other storage location for later use. Storing workout adjustments in this manner provides the ability to reuse the manually entered data so the underwriters are not required to re-enter such overrides each time a decision is run on a particular loan.

As noted above, the resulting loan workouts may be stored in the decision database 124. This allows returning to the displayed loan workouts 202 at a later date if necessary. Such a "re-run" of the displayed decisions is useful, for example, in an appeal of a decision. For an appeal, it may be necessary to hold most data constant from the original decision. The only data in the appeal that is different from the original decision are a certain few fields the user is specifically allowed to edit in an appeal. The credit rules in force at time of original decision typically must be used for the appeal. FIG. 4 illustrates an example of an workout review screenshot that may be displayed via the user interface 110. The display 200b shows details of the information used in calculating the various loan workouts 202. Various input boxes 230 are provided that allow revising input data such as income, expenses, etc. based on appeal criteria.

Further, the example display 200b includes a history section 240 that captures various changes made for later use. The historical data may be useful for appeals, and also in other situations where a user has overridden workout level details.

Thus, via the user interface 110 a system user can enter a loan number and review decision history for the particular loan, the borrower, etc., and if desired, can review and/or edit & rerun aspects of previous decisions run on the loan for purposes of an appeal, mediation, litigation, etc.

Example systems disclosed herein provide the ability to evaluate and underwrite multiple loan products simultaneously and determine loan alternatives to avoid default. For instance, loan investors (Freddie Mac, Fannie Mae, private investors, etc.) and loan guarantors (VA, FHA, USDA, private insurers, etc.) may each have rules and regulations specific to the particular agency. A single decision tool that performs calculations for a specific mortgage product would not easily allow comparison of multiple loan workout options.

Further, some financial institutions provide many types of loan products, and these different types of loans may require workouts. In addition to mortgage loans, a lender may offer car loans, secured/unsecured personal loans or lines of credit, credit cards, home equity loans, home equity lines of credit, etc. Examples of the systems disclosed herein are configured to evaluate a single loan, as well as multiple loans related to the same borrower and provide workout options for all the evaluated loans. Some example embodiments provide workouts that are specific to each single loan, and/or options that cover more than one loan. For example, when evaluating a 1st lien mortgage plus a 2nd lien home equity loan, a workout options could include modifying both loans separately with the borrower still ending up with two separate but modified loans, or combining both loans into one new loan (a modified version of one loan plus a full or short payoff of the other loan).

FIG. 5 is a flow diagram generally illustrating an example of a process 150 executed by the system shown in FIG. 1. Since different types of loans may be evaluated, the type of loan is determined in block 152. In block 154, loan and borrower information is received for the particular loan. Loan information may be obtained, for example, from the loan database 122 shown in FIG. 1. In some embodiments, the rules engine 112 is configured to determine workout options for more than one loan. In such configurations, if another loan is to be added to the decision as determined in decision block 160, the process loops back to block 152 where the type of loan is determined, and the process repeats until there are no more loans to be added to the decision, in which case workout rules are received in block 156, such as by the decision engine 112 accessing one or more suitable databases such as the rules database 120 and/or the external rules database 132 shown in FIG. 1. Additional databases and other rules sources may further be consulted. Based on the information obtained in blocks 152-156, workout options are determined in block 158, and the workout options may be displayed in block 162.

The rules received and executed by the decision engine 112 thus ensure that each set of policy rules is applied/evaluated in the proper order and to the correct loan, and the resulting workout options are presented back to the user in the correct hierarchical order for offering to the borrower. For example, an FHA guaranteed loan may be owned by FNMA as the investor, and serviced by a bank. All three of those entities (Guarantor=FHA, Investor=FNMA, Servicer=bank) may have their own policy rules, and each one can define their own workout options, which are obtained from the appropriate sources by the decision engine 112. In certain specific examples, FHA's rules take 1st precedence, followed by FNMA's, then in third place comes the Servicer's.

In another example, first and second mortgages are both serviced by a single bank, but the first mortgage is owned by FNMA and the second is owned by a private bank. In a situation such as this, FNMA's policy takes first precedence on the 1st mortgage, the private bank's policy takes first precedence on the second mortgage, and the bank's servicer policy applies secondarily to both loans.

The decision engine 112 may further be configured to operate with potentially conflicting or competing rules to evaluate various loans according to the type of loan. For example, the decision engine 112 could be configured to execute only internal rules (like for an FHA loan) or to also use the Servicing Management Default Underwriter (SMDU) external rules engine (like for a FNMA loan). The decision engine 112 could further be configured to select among several data or calculation sources, such as whether to use an internal NPV calculation service or use the external calculation service 134 such as the Treasury NPV calculator, or to not run NPV calculations at all. Loan servicing data could be obtained from internal sources or various external service sources 130.

Figure 6:
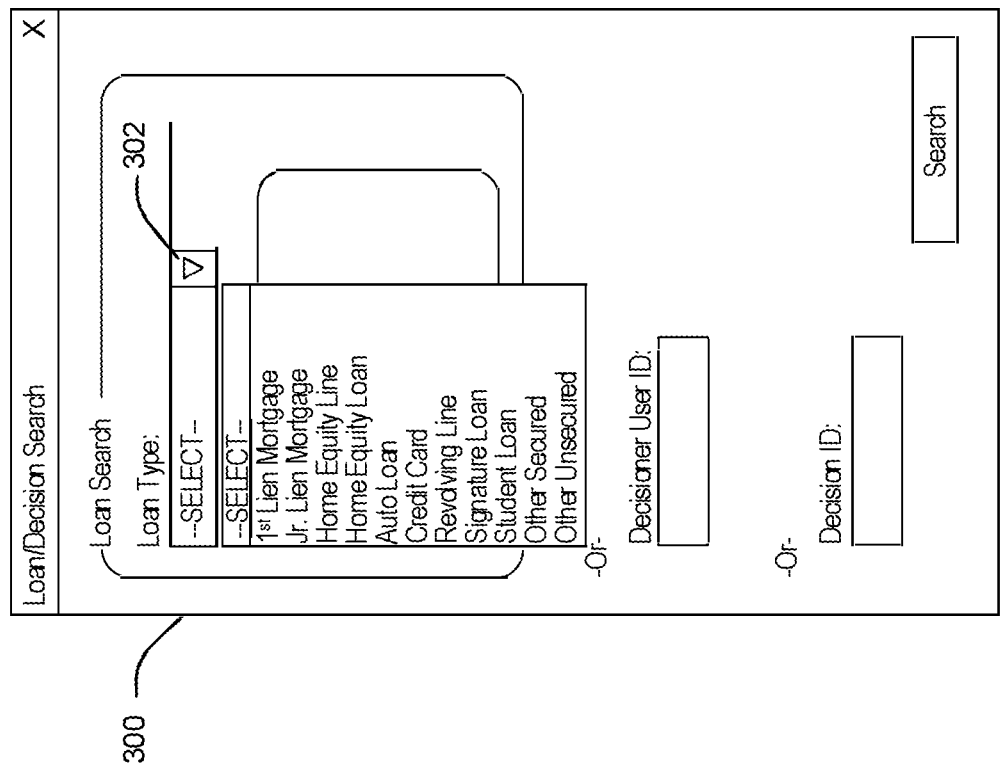
FIG. 6 is a user interface screen shot illustrating an example of a loan search and selection display.

FIG. 6 shows an example user interface display 300 suitable for embodiments where the decision engine 112 is configured to work with different types of loans. The display 300 includes a loan type selection box 302 in which a user can select among various types of loans including, for example, first lien mortgage, junior lien mortgage, home equity loan, home equity line, auto loan, credit loan, revolving line, signature loan, student loan, and other secured and unsecured loans.

Figure 7:
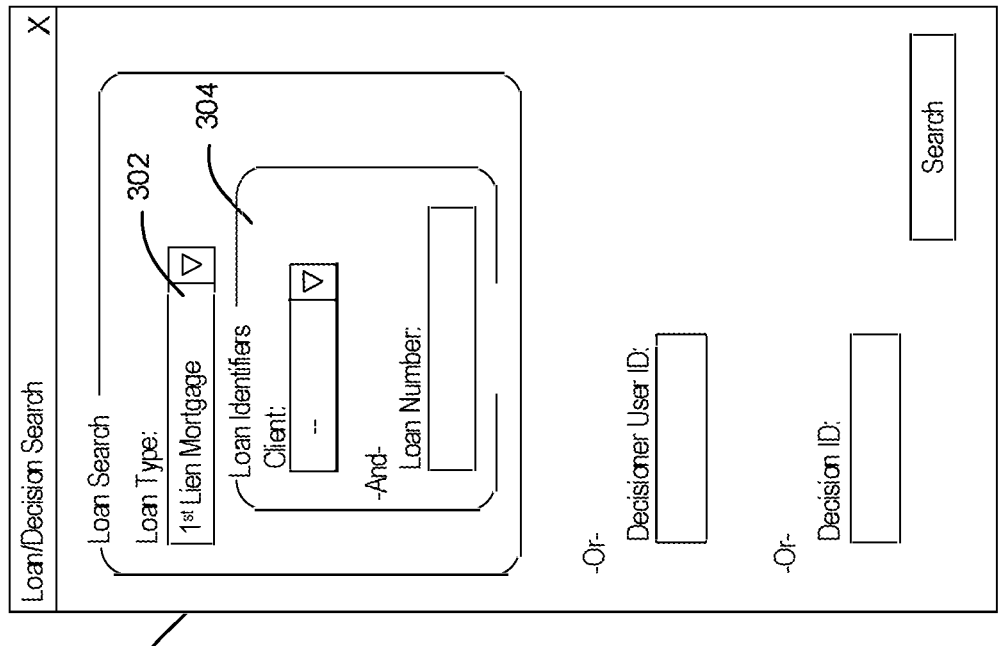
FIG. 7 is a user interface screen shot illustrating further aspects of the display of FIG. 6.
Figure 8:
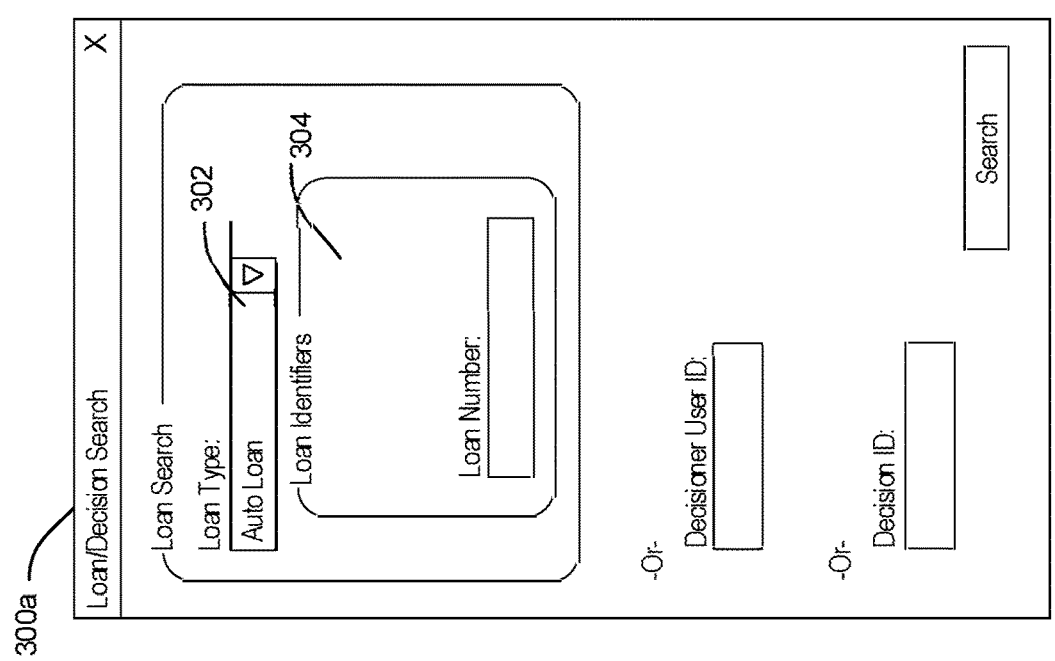
FIG. 8 is a user interface screen shot illustrating further aspects of the display of FIG. 6.

Depending on the type of loan selected by the user, the loan identifier search criteria appropriate for that loan type is displayed as shown in FIG. 7. For example, if the user selects first lien mortgage in the loan type selection box 302, then both client number and loan number search criteria fields are displayed in a loan identifier search box 304. If a different loan type is selected in the loan type selection box 302, such as an auto loan, then only a loan number search criteria field is displayed in the loan identifier search box 304 as shown in FIG. 8.

Figure 9:
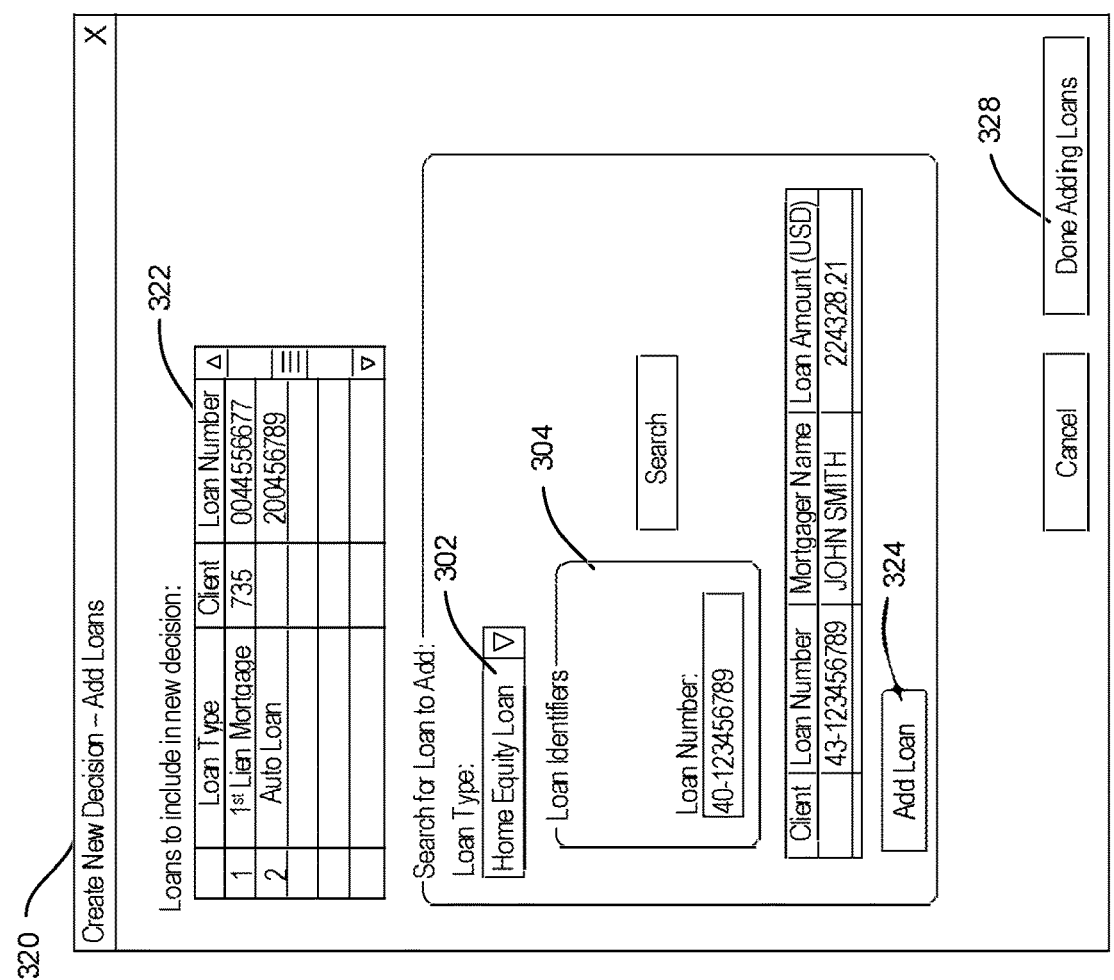
FIG. 9 is a user interface screen shot illustrating an example of a loan search and selection display for adding additional loans to a decision.

As noted above, the decision engine 112 may be configured to provide workout options for more than one loan. FIG. 9 illustrates another user interface 320 in which multiple loans may be included in a decision. The user interface 320 includes a listing 322 of loans currently included, as well as a search interface similar to that shown in FIGS. 6 and 7 that includes the selection box 302 for identifying the loan type, and based on the selected loan type, the selection box 304 for selecting the appropriate loan identifier. Once the user selects the desired loan, the loan may be added to the list 322 by selecting an add loan actuator 324. When the user has finished adding loans, the done adding loans actuator 328 is selected.

FIG. 10 illustrates a workout review display 400 in which decision results for multiple loans is displayed. As noted above, in addition to determining workout options for multiple loans, the decision engine 112 may be configured to determine workout options for different types of loans. Thus, the display 400 provides workout options for more than one loan, and loans of different types as selected by a user using user interfaces generated by the decision engine 112 such as those illustrated in FIGS. 6-9. The display 400 provides a listing of the selected loans, and loan details 402 for each loan that are displayed in response to a selection of a specific one of the loans. In FIG. 10, loan details 402 are displayed for the selected loan 410 ("Loan 1: $1^{st}$ Lien Mortgage"). The other two displayed loans 412, 414 are collapsed so details are not shown in the display 400.

FIG. 11 illustrates a display 420 of a Plan Summary table, which shows a summarized list of all the available workouts 422, along with the eligibility determination 424 for each workout option. In the display 420 shown in FIG. 11, there is a tab 426 for displaying workout options for all loans, three tabs 430, 432, 434 corresponding to the three individual loans for which workout options were determined, a Manual Inputs Review tab 436 and a Borrower Letter tab 438. Additionally, plan results tabs could be provided for various combinations of some but not all loans in the decision. FIG. 12 illustrates a display 420a in which the tab 430 has been selected for loan 1. Selecting a workout option in the display 420 or 420a accordingly displays the workout details of the selected option in expandable/collapsible categorized sections, as illustrated in the example shown in FIG. 3.

Figure 13:
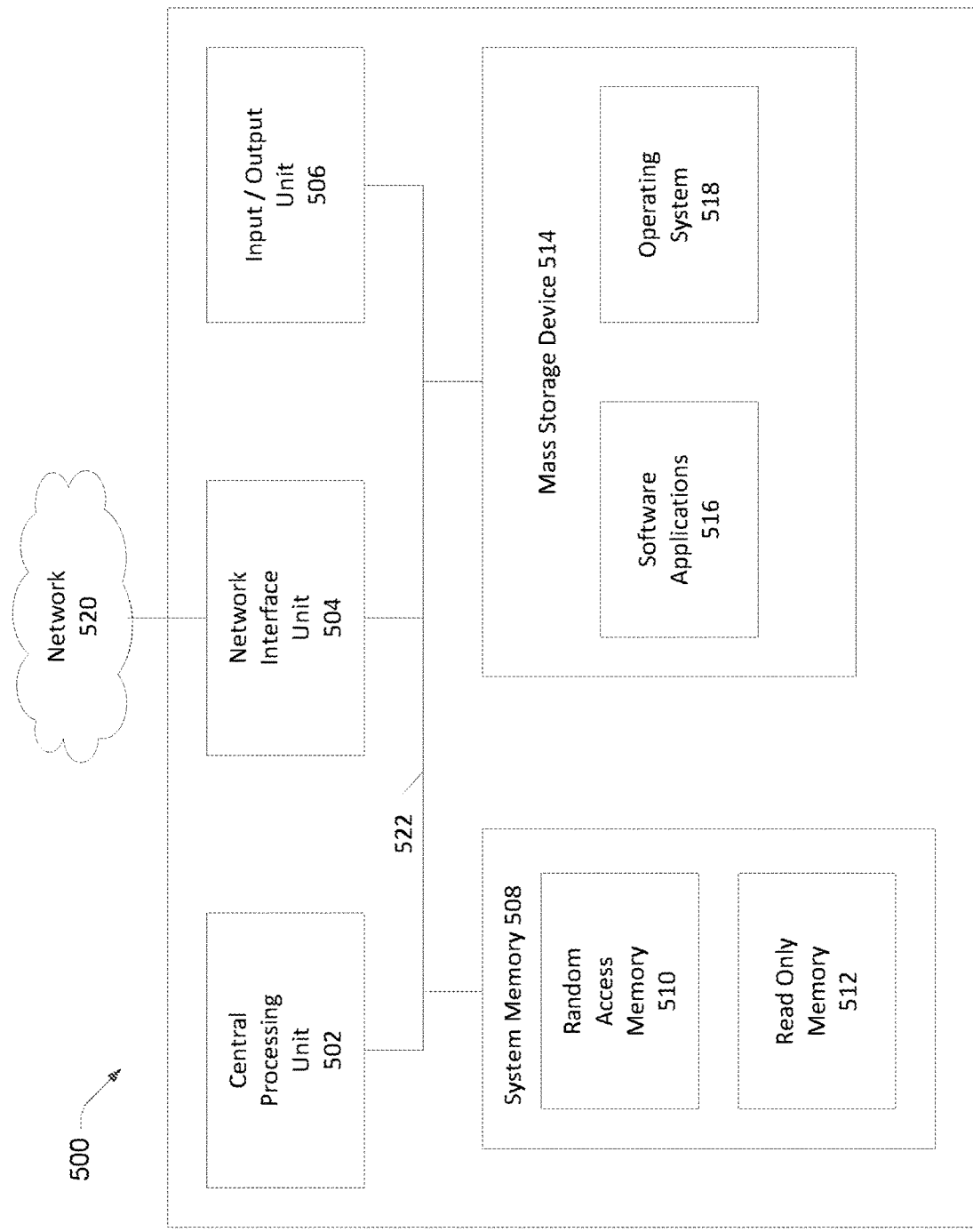
FIG. 13 is a block diagram illustrating portions of an example computer system.

FIG. 13 schematically illustrates an example of a computer system suitable for implementing the decision engine 112. The computer 500 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the server computer 500, such as during startup, is stored in the ROM 512. The server computer 500 further includes a mass storage device 514. The mass storage device 514 is able to store software instructions and data. As noted above, one or more of the databases 120, 122, 124 could be implemented by the mass storage device 512, or one or more of the databases could be implemented by other computer systems accessible by the computer 500.

The mass storage device 514 is connected to the CPU 502 through a mass storage controller (not shown) connected to the system bus 522. The mass storage device 514 and its associated computer-readable data storage media provide non-volatile, non-transitory storage for the server computer 500. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 500.

According to various embodiments of the invention, the server computer 500 may operate in a networked environment using logical connections to remote network devices through the network 520, such as a wireless network, the Internet, or another type of network. The server computer 500 may connect to the network 520 through a network interface unit 504 connected to the system bus 522. It should be appreciated that the network interface unit 504 may also be utilized to connect to other types of networks and remote computing systems. The server computer 500 also includes an input/output controller 506 for receiving and processing input from a number of other devices, including the user interface 110, which could include a touch user interface display screen, or another type of input device. Similarly, the input/output controller 506 may provide output to a touch user interface display screen or other type of output device.

As mentioned briefly above, the mass storage device 514 and the RAM 510 of the server computer 500 can store software instructions and data. The software instructions include an operating system 518 suitable for controlling the operation of the server computer 500. The mass storage device 514 and/or the RAM 510 also store software instructions, that when executed by the CPU 502, cause the server computer 500 to provide the functionality of the server computer 500 discussed in this document. For example, the mass storage device 514 and/or the RAM 510 can store software instructions that, when executed by the CPU 502, cause the server computer 500 to implement the decision engine 112 shown in FIG. 1.

The disclosed system 100 thus provides an end to end solution for managing complex loan workout rules in one or multiple repositories, real time fetching of system data from multiple systems of record, determining borrower and loan eligibility, initial decisioning, re-decisioning, appeals, and final conversion for settlement.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computing system, comprising:
   a processor; and memory encoding instructions which, when executed by
the processor, cause the processor to:
access a first database storing a plurality of loan workout rules via a network, wherein the first database is a central repository for the plurality of loan workout rules associated with a plurality of loan entities, and wherein the first database and the computing system are located within a firewall of the network;
receive loan and borrower data regarding an existing loan;
determine a plurality of loan workout options based on the plurality of loan workout rules and the received loan and borrower data; and
display the plurality of loan workout options on a user interface including, for each loan workout option, a side-by-side comparison of loan aspects of the existing loan before applying the loan workout option, and the loan aspects as modified by the loan workout option, wherein the side-by-side comparison includes to display the existing loan and a selected one of the plurality of loan workout options simultaneously on the user interface.

2. The system of claim 1, wherein the user interface is configured to receive a manual override.

3. The system of claim 1, wherein the computing system is configured to access a second database that stores the borrower data regarding the existing loan.

4. The system of claim 1, wherein the computing system is configured to receive the loan and borrower data regarding the existing loan via the user interface.

5. The system of claim 1, wherein computing system is configured to access a third database that stores loan workout rules associated with at least one of a loan guarantor, insurer, investor and regulator.

6. The system of claim 1, wherein the first database stores loan workout rules associated with a plurality of loan investors.

7. The system of claim 1, wherein the first database stores loan workout rules associated with a plurality of loan guarantors.

8. The system of claim 1, wherein the first database stores loan workout rules associated with a plurality of loan regulators.

9. The system of claim 1, wherein the computing system is configured to display the existing loan and a selected one of the plurality of loan workout options simultaneously on the user interface.

10. The system of claim 1, wherein the computing system is configured to generate a borrower letter based on the plurality of loan workout options.

11. The system of claim 1, wherein the plurality of loan workout options includes at least one of temporary forbearance and permanent loan modification.

12. The system of claim 1, wherein the memory encodes further instructions which, when executed by the processor, cause the processor to:
receive loan and borrower data regarding a plurality of existing loans; and
determine a plurality of loan workout options for the plurality of existing loans based on the plurality of loan workout rules.

13. A computer implemented method, comprising:
receiving, at a computing system, via a network, a plurality of loan workout rules from a first database, wherein the first database is a central repository for the plurality of loan workout rules associated with a plurality of loan entities, and wherein the first database and the computing system are located within a firewall of the network;
receiving loan and borrower data regarding an existing loan from a second database;
receiving further loan and borrower data regarding the existing loan via a user interface generated by a computing system;
determining a plurality of loan workout options based on the plurality of loan workout rules, the loan and borrower data and the further loan and borrower data;
displaying a plurality of loan workout options on the user interface, wherein displaying the plurality of loan workout options includes displaying, for each loan workout option, a side-by-side comparison of loan aspects of the existing loan, before applying the loan workout option, and the loan aspects as modified by the workout option, wherein the side-by-side comparison includes displaying the existing loan and a selected one of the plurality of loan workout options simultaneously on the user interface.

14. The method of claim 13, wherein the further loan and borrower data received from the user interface includes edits to the loan or borrower data received from the second database.

15. The method of claim 13, further comprising saving the plurality of loan workout options in a decisions database.

16. The method of claim 15, further comprising:
receiving edits to the plurality of loan workout options via the user interface;
storing the received edits in the decisions database; and
displaying the stored edits on the user interface in the display of the plurality of loan workout options.

17. A non-transitory computer-readable data storage medium storing instructions which, when executed by a computing system, implement a method comprising:
accessing a first database to receive a plurality of loan workout rules, via a network, wherein the first database stores workout rules for a plurality of different loan types and wherein the first database is a central repository for the plurality of loan workout rules associated with a plurality of loan entities and wherein the first database and the computing system are located within a firewall of the network;
accessing a second database to receive loan and borrower data regarding an existing loan;
determining a plurality of loan workout options based on the plurality of loan workout rules and the loan and borrower data;
displaying a plurality of loan workout options on a user interface; and
displaying the existing loan on the user interface, wherein displaying the plurality of loan workout options includes displaying, for each loan workout option, a side-by-side comparison of loan aspects of the existing loan before applying the loan workout option and the loan aspects as modified by the workout option, wherein the side-by-side comparison includes to display the existing loan and a selected one of the plurality of loan workout options simultaneously on the user interface.

18. The non-transitory computer-readable data storage medium of claim 17, wherein the plurality of loan workout options includes at least one of temporary forbearance and permanent loan modification.

19. The non-transitory computer-readable data storage medium of claim 17, wherein method further comprises:

receiving loan and borrower data regarding a plurality of existing loans; and determining a plurality of loan workout options for each of the plurality of existing loans based on the plurality of loan workout rules.

20. The non-transitory computer-readable data storage medium of claim 17, wherein the executed method further comprises receiving edits to the loan and/or borrower data via the user interface and storing the edits to the loan and/or borrower data in a decisions database.

\* \* \* \* \*